(12) United States Patent
Wade et al.

(10) Patent No.: US 12,531,417 B2
(45) Date of Patent: Jan. 20, 2026

(54) UTILITY ENERGY CLOUD EXCHANGE

(71) Applicant: Electric Power Board, an Independent Board of the City of Chattanooga, Chattanooga, TN (US)

(72) Inventors: David Wade, Chattanooga, TN (US); Jim Ingraham, Chattanooga, TN (US)

(73) Assignee: Electric Power Board, an Independent Board of the City of Chattanooga, Chattanooga, TN (US)

( * ) Notice: Subject to any disclaimer, the term of this patent is extended or adjusted under 35 U.S.C. 154(b) by 0 days.

(21) Appl. No.: 18/667,638

(22) Filed: May 17, 2024

(65) Prior Publication Data

US 2024/0388093 A1 Nov. 21, 2024

Related U.S. Application Data

(63) Continuation of application No. 18/191,962, filed on Mar. 29, 2023, now Pat. No. 12,027,864, which is a continuation-in-part of application No. 17/847,916, filed on Jun. 23, 2022, now abandoned, which is a continuation of application No. 17/142,715, filed on (Continued)

(51) Int. Cl.

| | |
|---|---|
| *H02J 3/28* | (2006.01) |
| *H02J 3/38* | (2006.01) |
| *H02J 3/46* | (2006.01) |
| *H02J 7/35* | (2006.01) |
| *H02J 3/00* | (2006.01) |

(52) U.S. Cl.
CPC ............... *H02J 3/28* (2013.01); *H02J 3/38* (2013.01); *H02J 3/381* (2013.01); *H02J 3/388* (2020.01); *H02J 3/466* (2020.01); *H02J 7/35* (2013.01); *H02J 3/008* (2013.01); *H02J 2300/24* (2020.01)

(58) Field of Classification Search
None
See application file for complete search history.

(56) References Cited

U.S. PATENT DOCUMENTS 9,960,637 B2 * 5/2018 Sanders ................ H02J 3/388
2008/0272934 A1 * 11/2008 Wang ............... H02J 13/00024
340/870.11

(Continued)

*Primary Examiner* — Cassandra F Cox
(74) *Attorney, Agent, or Firm* — Chambliss, Bahner & Stophel, P.C.

(57) ABSTRACT

A system for accounting for and allocating energy value amongst (i) energy equivalent quantity (EEQ) suppliers associated with supplier accounts and that contribute EEQ to a total energy supply and (ii) energy consumers associated with a consumer account and that issue energy demands for energy. An energy cloud value allocation system (e-cloud) facilitates and controls an exchange of EEQ and energy between the EEQ suppliers and the energy consumers. The e-cloud receives EEQ contributions from the EEQ suppliers and generates energy credits, where a value of each energy credit is based on the EEQ contribution. The e-cloud is also configured to receive energy demands from the energy consumers and to satisfy the energy demands by delivering energy and EEQ to the consumers. Finally, the e-cloud generates energy debits, where a value of each energy debit is based on the EEQ that is delivered to the energy consumer from the e-cloud in response to energy demands.

19 Claims, 12 Drawing Sheets

Related U.S. Application Data

Jan. 6, 2021, now Pat. No. 11,404,881, which is a continuation of application No. 16/415,716, filed on May 17, 2019, now Pat. No. 10,923,917.

(60) Provisional application No. 62/672,679, filed on May 17, 2018.

(56) References Cited

U.S. PATENT DOCUMENTS

| | | | |
|---|---|---|---|
| 2013/0274936 A1* | 10/2013 | Donahue | H02J 13/00034 |
| | | | 700/291 |
| 2014/0094984 A1* | 4/2014 | Dykeman | H02J 3/008 |
| | | | 700/295 |
| 2015/0066231 A1* | 3/2015 | Clifton | H04L 12/2803 |
| | | | 307/46 |
| 2019/0234305 A1* | 8/2019 | Ramamurthy | H02J 15/003 |

\* cited by examiner

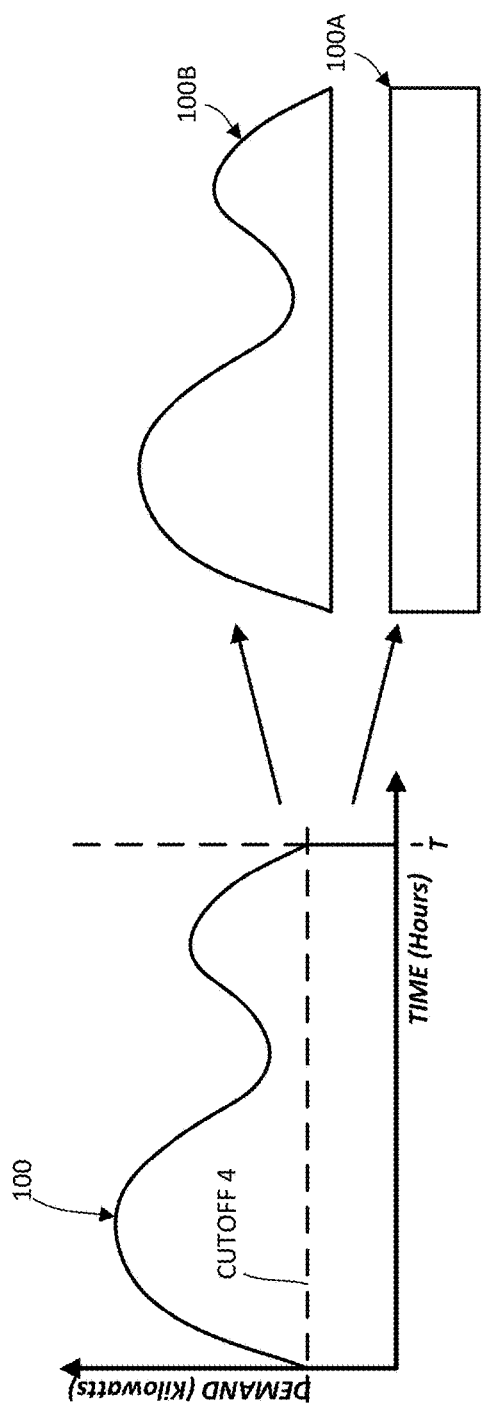
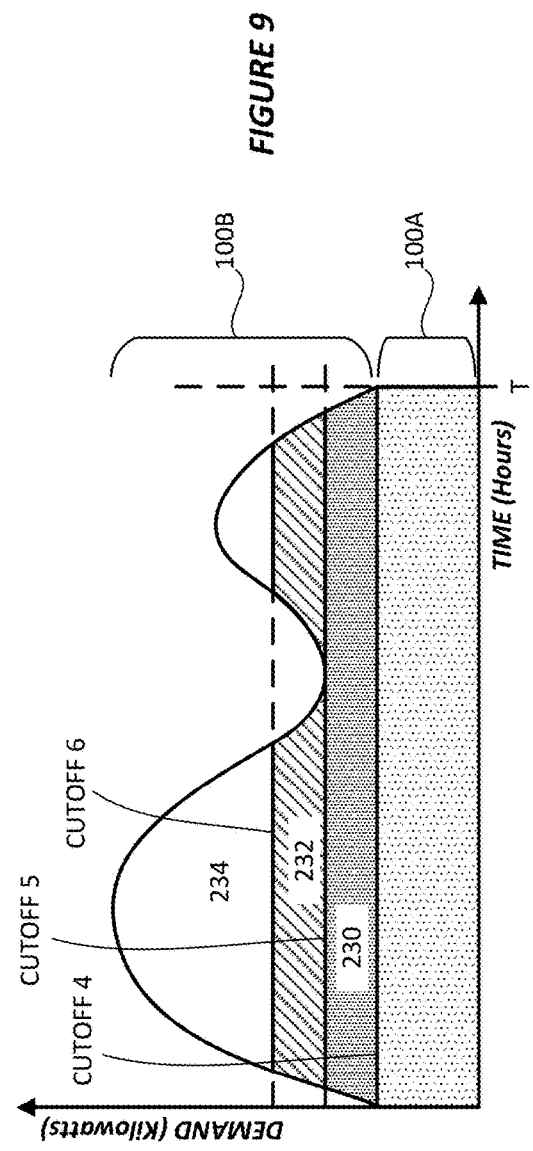
FIGURE 8
FIGURE 9

UTILITY ENERGY CLOUD EXCHANGE

CROSS-REFERENCE TO RELATED APPLICATIONS

This application is a continuation-in-part of application Ser. No. 17/847,916, entitled "System and Method for Energy Distribution", and filed Jun. 23, 2022; which is a continuation of Application No. application Ser. No. 17/142,715 entitled "System and Method for Utility Energy Storage and Distribution", and filed on Jan. 6, 2021, now U.S. Pat. No. 11,404,881; which is a continuation of Application No. application Ser. No. 16/415,716 entitled "System and Method for Utility Energy Storage and Distribution", and filed on May 17, 2019, now U.S. Pat. No. 10,923,917; and which claims the benefit of U.S. Provisional Application No. 62/672,679, entitled "Aggregated Energy Storage and Distribution System", and filed May 17, 2018; each of the foregoing applications is incorporated herein by reference in its entirety.

FIELD

The present invention relates generally to energy generation and distribution. More particularly, the present invention relates to an energy cloud value allocation system (e-cloud) for facilitating and controlling an exchange of energy and energy equivalent quantities (EEQ) and corresponding energy value between EEQ suppliers and energy consumers.

BACKGROUND

Generating and delivering electrical energy from an energy generation source to end users for their use conventionally involves a complex network of entities, systems, and infrastructure that each play varied and important roles in that delivery process. This complex energy system is often called the "electric power grid" or the "grid." According to the U.S. Energy Information Administration, the U.S. power grid in 2016 consisted of more than 7,300 power plants, nearly 160,000 miles of high-voltage power lines, and several million miles of low-voltage power lines and distribution transformers, providing electric service to some 145 million customers. In 2000, U.S. electricity was generated from a variety of sources and fuels, including natural gas, which provided 40% of U.S. electricity generation; renewables, which provided 20%; nuclear, which provided 20%; coal, which provided 19%; and petroleum, which provided 1%. The largest source of renewable energy was wind (8.4%), followed by hydro (7.3%), solar (2.3%), biomass (1.4%), and geothermal (0.4%).

Local electricity grids are interconnected in networks for commercial and reliability purposes. At the national level, the network serving the 48 lower states is made up of three major interconnections, the Eastern Interconnect, the Texas Interconnect, and the Western Interconnect. The scale of the interconnections permits generation resources to be more optimally located and provides multiple pathways for power to flow to maintain the stability and reliability of the grid. Regional balancing authorities make sure that electricity supply always matches power demand, providing a balance that permits reliable service of the grid as a whole.

In general, electricity is generated at the time of its use, as the demand for energy must be met with an equivalent supply. The instantaneous demand for energy varies over time and, as a result, the instantaneous supply also typically varies as well. The source of this electricity can vary. In some instances, an electric utility generates all of the electricity that it subsequently sells to its customers using power plants that it owns. On the other hand, some electric utilities purchase electricity from other utilities, power marketers, power producers, or wholesale power markets. The distribution systems that sell and distribute electricity can also vary and might involve not-for-profit municipal electric utilities, electric cooperatives owned by their members, or private for-profit companies owned by stockholders. or a power marketer.

When a utility purchases energy from an energy supplier, the price for that purchased energy may be comprised of three components. First, the price may include some type of flat customer charge, which may be called a "delivery point charge.".

Next, the price paid also typically includes a demand charge based upon the amount of energy delivered at a point in time. The demand charge is generally charged based on the peak demand seen during the relevant time period (e.g., during a given month). Thus, the higher the peak demand in a given time period, the higher the demand charge incurred, even if that peak demand is required only for an instant. The graph shown in FIG. 1 illustrates a time-varying demand curve 100 over some period of time that represents the demand for energy that might be required by a typical utility in order to service its customers. An area of curve 100 enclosed within circle 102 represents the peak demand over this time period. Thus, over this time period, the demand charge that would be incurred is based on this peak demand, which is represented by the dashed line labeled "DEMAND 1" and is visually shown by the two shaded regions under the dashed line. Under an alternative rate structure, Region 104 might represent a first demand (e.g., 50 kW) where no demand charge is incurred and Region 106 might represent a second demand for which a demand charge is incurred. As shown, even though the demand curve 100 only rises to the peak demand (i.e., DEMAND 1) for a single instant, the demand fee for the entire time period is based on that peak demand.

The graph shown in FIG. 2 illustrates another time-varying demand curve 108 over some period of time that represents the demand for energy that might be required by a utility in order to service its customers. An area of the curve 108 that is enclosed within circle 110 represents the peak demand over this time period, which is represented by the dashed line labeled "DEMAND 2." Unlike the graph shown in FIG. 1, where the peak was not significantly higher than average demand, this demand curve 108 includes a spike in demand such that the peak demand is significantly higher than the average demand that is located to the left of Time A or to the right of Time B. Nevertheless, as explained above, the demand charge that would be incurred in this scenario would be based on Demand 2.

The final component for the total cost of purchased energy is the energy or consumption charge, which is a fee that is based on how much electricity is actually consumed during the relevant time period. For example, in certain cases, the first 15,000 kilowatt-hours (kWh) would incur an energy or consumption charge of 5.440¢ per kWh. However, if the total energy used during the month exceeds 15,000 kWh, an additional fee of 3.108¢ per kWh is charged to the customer. The graph shown in FIG. 3 is similar to the graph in FIG. 1 and includes the same demand curve 100. If that demand is met then the area under the curve 100 is the total consumption, which is divided into two shaded regions. Region 112 might represent a first consumption portion (e.g., 15 kWh)

where no energy or consumption charge is incurred and Region 114 might represent a second consumption portion for which a consumption charge is incurred.

From the discussion above, it might be appreciated that, if peak demand can be reduced, the demand charge incurred can be limited. Additionally, if the overall consumption of energy can be reduced, the consumption charge incurred can also be limited. Thus, reducing the peak demand and the overall energy need can each provide cost savings. However, existing technologies have failed to provide a system or method that enables, simplifies, or effectively incentivizes the reduction of peak demand and overall consumption of energy. Accordingly, what is needed is a system and method for reducing the overall cost of energy delivery from suppliers to consumers and for incentivizing the adoption of technologies and practices that will enable the overall energy demand and amount of purchased energy to be reduced and controlled.

There multiple ways that the demand and consumption of energy can be met other than through the generation or purchase of additional quantities of energy. One way to reduce energy consumption is to forego a use or activity that consumes energy. Similarly, energy demand may be reduced by shifting the time period in which an amount of energy is consumed. These changes in consumption or demand may be effected through a change in the consumer's behavior or through investment in a variety of improvements, devices, or equipment that permit more efficient use of energy, thus reducing energy consumption, energy demand, or both. In such cases, the improvements, devices, or equipment are substituting efficiency or shifts in consumption patterns for the generation and use of additional demand or energy. Examples include, without limitation, such things as building weatherization improvements that permit the use of less energy to provide the same level of heating or cooling comfort in the building; geothermal heat pumps that use near-constant temperature groundwater to increase the efficiency of heat pumps for space conditioning or water heating; programmable thermostats that turn off space heating devices during periods of high demand; or utility-scale batteries that permit a utility to store energy generated or purchased during off-peak periods and to provide that stored energy during periods of high demand. The amount of energy or demand savings produced by each such method may be quantified and valued and as "energy equivalent quantities" or "EEQs".

Notes on Construction

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

As further described below, the phrase "energy cloud value allocation system" or "e-cloud" means a system configured to track and to account for contributions of energy equivalent quantities (EEQ) and energy from EEQ suppliers to the e-cloud. These contributions might originate from a number of sources, including solar panel arrays, and be used immediately by others or stored for later use by the EEQ supplier (i.e., when functioning as an energy consumer) or by another energy consumer. The e-cloud is also configured to track and account for the transfer of EEQ and energy from the e-cloud to an energy consumer.

SUMMARY

The above and other needs are met by a system for accounting for and allocating energy value amongst an energy equivalent quantity (EEQ) supplier that is associated with a supplier account and that is configured to contribute EEQ to a total energy supply and energy consumers that are each associated with a consumer account and that are each configured to issue energy demands for delivery of energy. The system includes an energy cloud value allocation system (e-cloud) that is configured to facilitate and control an exchange of EEQ and energy between the EEQ supplier and the energy consumers. The e-cloud is also configured to receive EEQ contributions from the EEQ supplier and to generate an accounting of energy credits, wherein a value of each energy credit is based on the EEQ contribution provided to the e-cloud by the EEQ supplier. The e-cloud is also configured to receive energy demands from the energy consumers and to satisfy the energy demands by delivering energy and EEQ to the consumers. Finally, the e-cloud also generates an accounting of energy debits, where a value of each energy debit is based on the EEQ that is delivered to the energy consumers from the e-cloud in response to energy demands.

In certain embodiments, the system includes the EEQ supplier itself. In preferred embodiments, the EEQ supplier includes a constant energy supply configured to provide a constant supply of the total energy supply and a micro-grid configured to provide a variable supply of the total energy supply. The micro-grid preferably includes two or more of an energy generator, an energy storage, and demand-side management. In certain embodiments, when a total energy demand of the energy consumers does not exceed the constant energy supply, the e-cloud is configured to satisfy the energy demands by providing energy to the energy consumers using only the constant supply of the total energy supply. Additionally, when the total energy demand exceeds the constant energy supply, the e-cloud is configured to satisfy a first portion of the energy demands by providing energy to the energy consumers using the constant supply of the total energy supply and to satisfy a remaining portion of the energy demands by providing EEQ to the energy consumers using the variable supply from the e-cloud. More preferably, when the total energy demand exceeds the constant energy supply, the e-cloud is configured to satisfy the first portion of the energy demands by providing energy to the energy consumers using a constant amount of energy of the constant supply of the total energy supply and to satisfy the remaining portion of the energy demands by providing EEQ to the energy consumers using a variable amount of EEQ of the variable supply from the e-cloud.

The present disclosure also provides an energy delivery and accounting system that includes a total energy supply that includes a constant supply and a variable supply. The system also includes energy equivalent quantity (EEQ) suppliers that are each associated with a supplier account and that are each configured to contribute EEQ to the variable supply of the total energy supply. Additionally, energy consumers are associated with a consumer account and are configured to issue energy demands for delivery of energy. Collectively, the energy consumers demand a total energy demand that includes a constant demand and a variable demand. Additionally, the system includes an energy cloud value allocation system (e-cloud) for (i) facilitating and controlling an exchange of EEQ between the EEQ suppliers and the energy consumers and (ii) allocating energy value amongst the EEQ suppliers and the energy consumers. The e-cloud provides supplier accounts and associates a supplier account with each of the EEQ suppliers. Additionally, the e-cloud provides consumer accounts and associates a consumer account with each of the energy consumers. The e-cloud also receives EEQ contributions from EEQ suppliers and issues energy credits. The value of the energy credit issued is based on the EEQ contributed to the e-cloud by the EEQ supplier. The e-cloud also receives and satisfies energy demands from energy consumers by delivering energy and EEQ from the e-cloud to the energy consumers. Preferably, when the total energy demand does not exceed the constant supply, the e-cloud delivers a variable amount of energy to the energy consumers from the constant supply of the total energy supply. On the other hand, when the total energy demand exceeds the constant supply, the e-cloud preferably delivers a constant amount of energy to the energy consumers from the constant supply of the total energy supply and delivers a variable amount of EEQ of the variable supply. Finally, the e-cloud issues energy debits to consumer accounts. A value of the energy debits issued is based on the EEQ delivered to the energy consumer from the e-cloud.

In certain embodiments, in satisfying energy demands, the e-cloud is configured to selectively choose EEQ that was contributed to the e-cloud by a first EEQ supplier and to not choose EEQ that was contributed to the e-cloud by a second EEQ supplier. In some instances, the e-cloud choose EEQ so as to minimize a cost associated with satisfying the energy demand. For example, in some cases, EEQ is selectively chosen so as to minimize the cost to the energy consumers. In other cases, EEQ is selectively chosen so as to minimize the cost to the energy distributors.

In certain embodiments, the energy consumers include: (i) a first energy market formed by energy consumers that, collectively, demand a first total energy demand; and (ii) a second and separate energy market formed by energy consumers that, collectively, demand a second total energy demand. Preferably, the e-cloud is configured to provide energy and EEQ in response to energy demands received from both the first energy market and the second energy market. In some cases, EEQ is provided in response to energy demands from the second energy market only when the total energy supply exceeds the first total energy demand. In other cases, the energy consumers are selected from the group consisting of: a wholesale energy market, a retail energy market, and an end user.

In certain embodiments, EEQ suppliers are selected from the group consisting of: an energy generator, an energy storage, and demand-side management (DSM). In some cases, the EEQ provided from the e-cloud to the energy consumers in response to energy demands is comprised of EEQ sourced from a combination of at least two different EEQ suppliers. In some instances, the two different EEQ suppliers vary over time as EEQ is provided to the energy consumers. In some cases, the two different EEQ suppliers include at least two of the group consisting of: an energy generator, an energy storage, and DSM.

According to certain embodiments of the invention, a first end user is both an EEQ supplier and an energy consumer and a first end user account that is associated with the first end user includes both a supplier account and a consumer account. At a first time period, the e-cloud receives EEQ from the first end user and issues a corresponding energy credit to the first end user account. Then, at a second and different time period, the e-cloud receives an energy demand from the first end user. In response to the receipt of the energy demand from the first end user, the e-cloud provides EEQ from the e-cloud to the first end user and issues a corresponding energy debit to the first end user account.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein:

FIG. 8 depicts a portion of the demand depicted of FIG. 3 that is enclosed within a box identified by "FIG. 8" and includes a CUTOFF 4, which divides a time-constant portion and a time-varying portion of the demand;

FIG. 9 depicts the portion of the demand shown in FIG. 8 and including shaded regions to represent sources of energy or an "energy equivalent quantity" or "EEQ" that may be used to meet the demand according to a first embodiment of the present invention;

DETAILED DESCRIPTION

Figure 1:
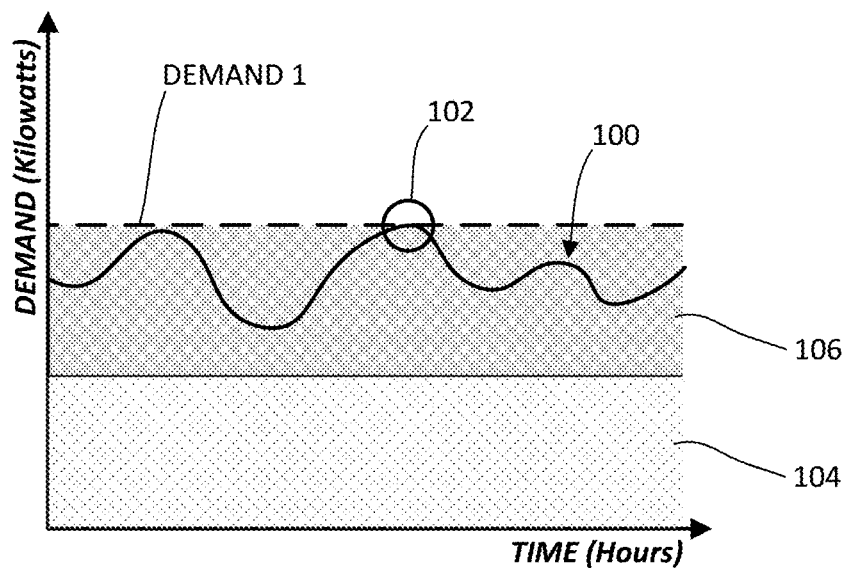
FIG. 1 depicts a conventional electrical energy demand curve showing two different demand regions.
Figure 2:
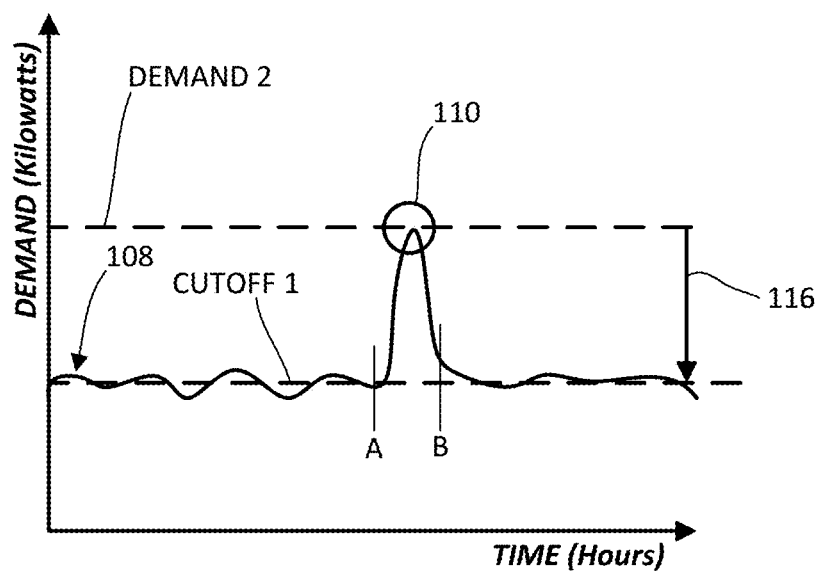
FIG. 2 depicts a conventional electrical energy demand curve having an extraordinarily high peak demand and a first demand cutoff (i.e., CUTOFF 1)
Figure 4:
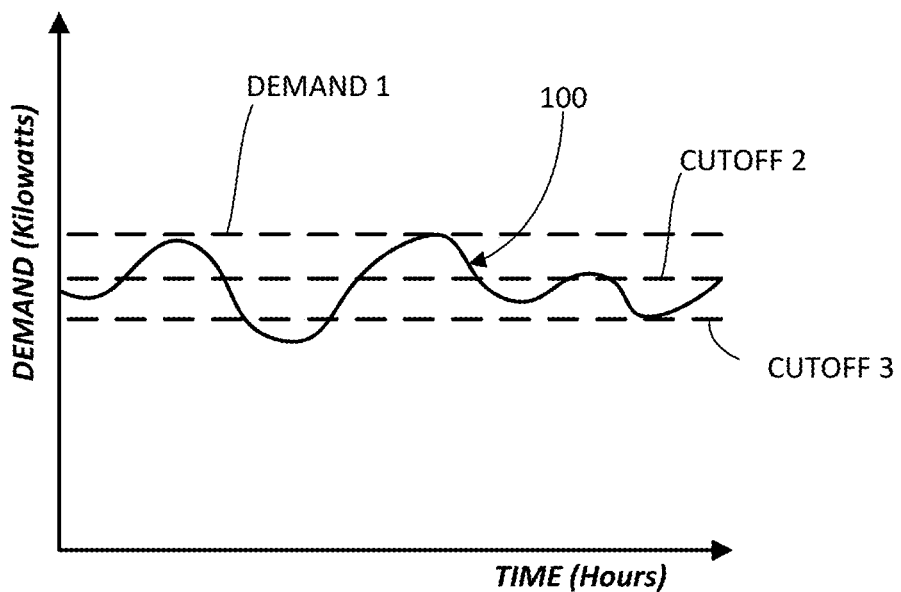
FIG. 4 depicts the demand curve of FIG. 3 and includes a second and third demand cutoff (i.e., CUTOFF 2 and CUTOFF 3)

With reference again to FIG. 2, for the reasons discussed above, when energy is purchased, a significant cost savings can be realized if demand peaks, such as peak 110, can be avoided or "shaved" so as to reduce the peak demand to some lesser amount (e.g., "CUTOFF 1"), as illustrated by the arrow 116. It may be appreciated that, as the demand is lowered or cutoff to some lesser amount than the peak demand, the demand charge is reduced. In FIG. 4 demand curve 100 and DEMAND 1 are illustrated again. A first cost savings may be realized by limiting the peak demand to a first lesser amount (e.g., "CUTOFF 2") or a second and greater cost savings may be realized by further limiting the peak demand to a second and lesser amount (e.g., "CUTOFF 3"). This type of cutoff may be accomplished, for example, when a utility company simply agrees to purchase a fixed amount of energy (e.g., CUTOFF 2) from an energy distributor, such as TVA, that is less than the actual peak demand (e.g., DEMAND 1). Then, by further reducing the amount of electricity that is purchased (e.g., moving down from CUTOFF 2 to CUTOFF 3), the energy demand and the related demand charge is further reduced.

Figure 5:
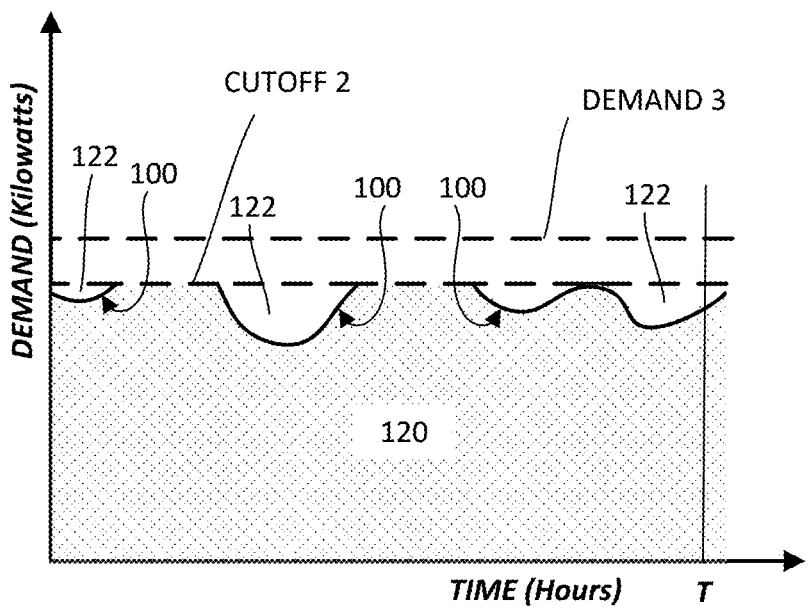
FIG. 5 depicts the demand curve of FIG. 4 after the demand has been limited to CUTOFF 2.

By cutting off the demand in this manner (i.e., by shaving off the peaks in the demand curve 100), the efficiency of use of the energy demand is increased. In other words, the amount of energy consumed is more closely matched to the amount of energy demand. A measure of this efficiency of use is sometimes determined using "load factor", which is equal to the total amount of energy consumed (in kWh) divided by the product of the peak energy demand (or the cutoff peak) (in kW) multiplied by some time period (in hours). With reference to FIG. 5, where the demand curve 100 has been limited by CUTOFF 2, the load factor over time T is equal to the shaded area 120 that is located below CUTOFF 2 and demand curve 100 over time T divided by the product of CUTOFF 2 multiplied by time T. Providing this first cutoff improves the efficiency of consumption of the energy demanded (and paid for), but there are still areas 122 where consumption does not rise to the level of energy demanded. These areas 122 represent inefficiencies because the amount of energy demanded and paid for via the demand charge are not ultimately consumed by end users. These areas 122, thus, lower the load factor and are, ideally, eliminated in order to improve efficiency of use of the demanded energy.

Figure 6:
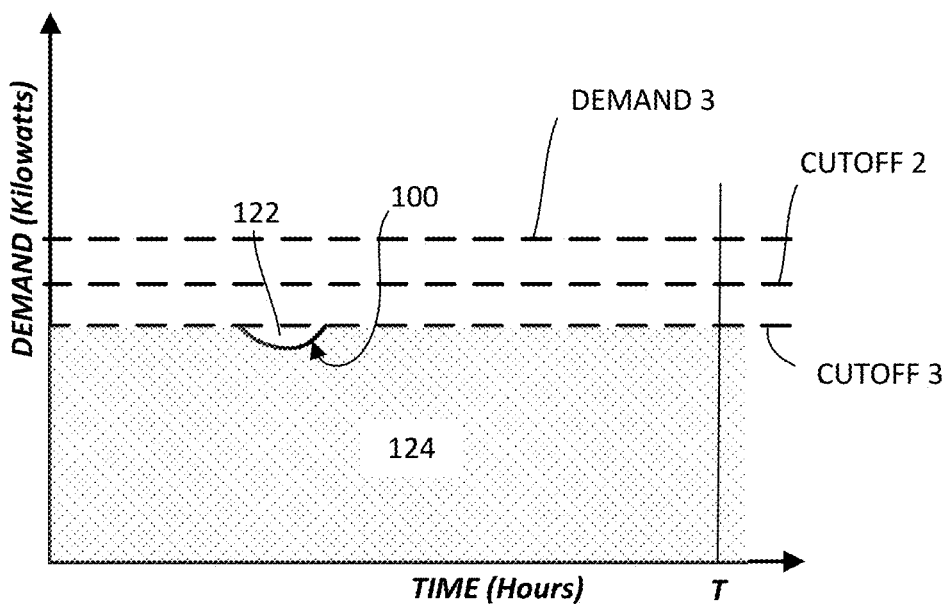
FIG. 6 depicts the demand curve of FIG. 4 after the demand has been limited to CUTOFF 3.

Accordingly, in FIG. 6, the demand is further limited to CUTOFF 3. The load factor over time T is equal to the shaded area 124 that is located below CUTOFF 3 and demand curve 100 over time T divided by the product of CUTOFF 3 multiplied time T. Most of the areas 122 where consumption did not rise to the level of energy demanded have been eliminated, which means that the load factor in FIG. 6 is higher than the load factor in FIG. 5. Ideally, the load factor is 100% or is as close to 100% as possible, which would occur when all of the energy demanded is consumed. This is the most efficient and least costly means for purchasing and consuming energy.

As noted above, demand may be limited as described above by only purchasing a fixed amount of energy (e.g., purchasing energy only up to CUTOFF 3). By limiting the demand in this way, some of the total demand is met using purchased energy. However, not all of the energy demand is met (e.g., the energy demand above CUTOFF 3 is not met by purchased energy). In this scenario, therefore, there is a gap between the amount of energy that is purchased by the utility and the amount of energy that is demanded by the end users. Thus, cutting off or limiting demand of purchased energy provides an opportunity to reduce overall costs to the utility but it also leaves the problem of filling that gap to meet the total energy demand.

One way to fill the gap between purchased energy and demanded energy is by simply reducing the total energy demanded and consumed. This can be accomplished through "demand-side measures," "demand-side management" or "DSM", which is the modification of consumer demand for energy in order to reduce energy needs and costs. DSM shifts demand and reduces costs using a variety of methods, including financial incentives, adoption and use of alternative technologies (e.g., more energy efficient technologies), time-shifting demand (e.g., moving demand to off-peak hours), etc. In one example, DSM measures might include the adoption and use of more energy efficient products (e.g., dryers, ovens, etc.). Other DSM measures might include using energy-heavy appliances (e.g., dryers, electric vehicle car chargers, etc.) during off-peak times of the day, such as during the night. These DSM measures allow for peak energy demands to be reduced or to be shifted to non-peak times and allows the utility to avoid purchasing more energy to meet the demand at peak times.

Another way to fill the gap between purchased energy and demanded energy is by obtaining energy from other sources. For example, a small but growing amount of electricity is produced through distributed generation or distributed energy resources ("DER"), which are small-scale electric generation units that are typically located where the electricity is used (e.g., at a home or business) and provide an alternative to or an enhancement (i.e., supplement) of the traditional grid. DER is generally considered a faster and less expensive option compared with the construction of large power plants, transmission lines, etc. DER also offers utilities and end users the potential for lower cost and higher reliability, quality, and efficiency in the energy that they provide and use. DER might include generators, back-up generators, on-site power systems, etc. They can be operated using conventional fuels, such as coal, natural gas, etc., but can also utilize renewable energy resources. For that reason, solar panels and wind turbines might provide the energy for certain DER. An advantage of DER is that provides an opportunity to reduce the overall consumption These two examples given above may be described as "energy equivalents" because they enable energy demands to be met in place of energy purchased from an energy distributor. More particularly, a reduction or shift in 10 kWh of energy consumption via DSM measures during times of peak demand is the equivalent to the purchase of 10 kWh of energy from an energy distributor. Thus, these DSM measures would permit the utility to avoid the purchase of that quantity of energy from an energy distributor. Similarly, energy provided by DER may be used in place of purchased energy and would also permit the utility to avoid the purchase of that quantity of energy from an energy distributor. Thus, the quantities of energy that are reduced/shifted via DSM or offset via DER may be described as an "energy equivalent quantity" or "EEQ." Batteries and other forms of energy storage are another form of EEQ.

However, there are costs associated with these and other similar EEQ options that have made their widespread adoption by the public, utilities, etc. difficult and slow. For example, with DSM, end users are asked to modify their behavior in ways that might be uncomfortable to them. For example, they might be asked to operate their air conditioning units less in the summer time or their heaters less in the winter time in order to reduce energy demands. On the other hand, with DER and battery storage, there can be significant adoption and infrastructure costs, such as building a solar panel array or purchasing a generator. The systems and methods of the present invention, which are detailed below, seek to reduce the overall cost of energy delivery from suppliers to consumers and to incentivize the adoption of technologies and practices that will enable the overall energy demand and amount of purchased energy to be reduced and controlled.

Figure 7:
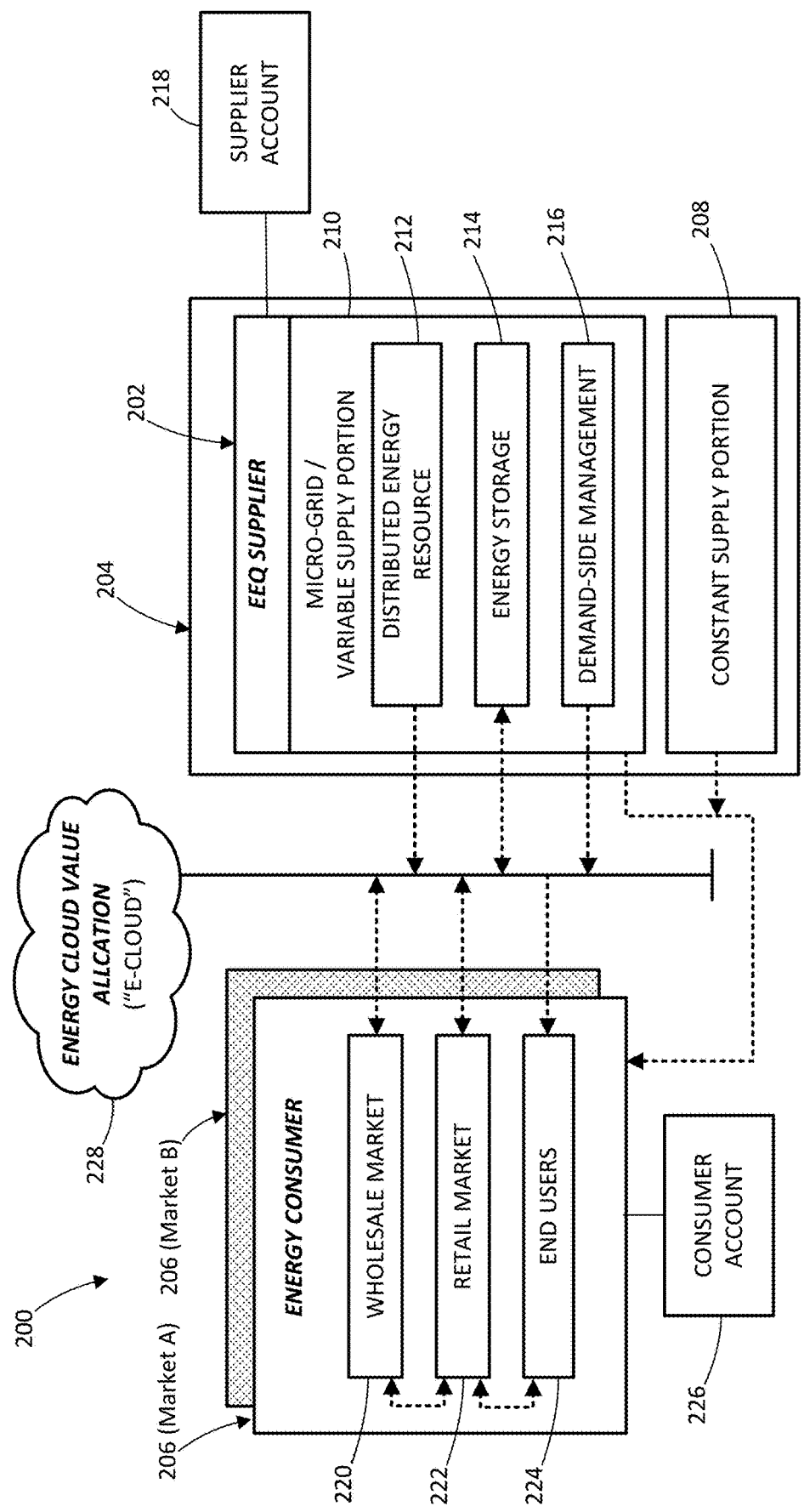
FIG. 7 depicts an energy delivery and accounting system according to an embodiment of the present invention.

With reference to FIG. 7, there is shown an energy delivery and accounting system 200 according to an embodiment of the present invention. In preferred embodiments, the system 200 includes a plurality of energy equivalent quantity (EEQ) suppliers 202 that are each configured to supply an EEQ as a contribution to a total energy supply 204 that is available for use by a plurality of energy consumers 206. Energy consumers 206 may be located in two or more different energy markets. In FIG. 7, two markets are shown, namely Market A and Market B. Each of these may be composed of a unique group of customers and end users that, collectively, demand a total energy demand in that market that is separate from the total energy demand of consumers in a different market. As further discussed below, in certain cases, the total energy supply 204 may be shared amongst a variety of energy consumers and markets.

The total energy supply 204 preferably includes a constant supply 208, which may include electrical energy that is purchased from a utility and for which demand and consumption charges are incurred. Additionally, a micro-grid 210 that is separate from the "grid"-tied constant supply 208 contributes a variable supply to the total energy supply 204. In preferred embodiments, the EEQ provided by the micro-grid 210 is sourced from one or more of the following: DER 212, energy storage 214 (e.g., batteries), and/or demand-side management 216. In the description that follows, the term "micro-grid" and "variable supply" may be used interchangeably and may each be referenced using reference number "210."

In preferred embodiments, each of the EEQ suppliers 202 is associated with a supplier account 218. The energy consumers 206 each issue energy demands that demand delivery of an amount of energy. Consumers might include, for example, a wholesale energy market 220, a retail energy market 222, or end users 224 that purchase or use energy. Preferably, each of the energy consumer 216 is associated with a consumer account 226. Finally, the system 200 also includes an energy cloud value allocation system (e-cloud) 228 for facilitating and controlling the delivery of energy and EEQ to the plurality of energy consumers 206. As discussed below, this system 200 is useful for accounting for and allocating energy value amongst the EEQ suppliers 202 and energy consumers 206. Additionally, the system 200 is useful for facilitating and controlling an exchange of energy and EEQ between the EEQ suppliers 202 and the energy consumers 206. In FIG. 7, dashed lines are provided with either a single arrow head or a double arrow head. In each case, the arrow head indicates the direction and locations that energy or EEQ travels within the system 200, including into or out of the e-cloud 228 or bypassing the e-cloud entirely.

In use, the e-cloud 228 preferably provides both the supplier accounts 218 and the consumer accounts 226 and then associates a supplier account with each of the plurality of EEQ suppliers 202 and a consumer account with each of the plurality of energy consumers 206. The e-cloud 228 then receives EEQ contributions from the EEQ suppliers 202 and, in response to the receipt of such contributions, issues and generates an accounting of an energy credit to the supplier account 214 associated with the corresponding EEQ supplier. The value of each of the energy credits issued and associated with an EEQ supplier 202 is based on the EEQ contribution to the e-cloud 226 by the EEQ supplier 202. Similarly, the e-cloud 226 is also configured to receive energy demands from the energy consumers 216 and to provide energy or EEQ to meet or satisfy that demand. The energy demand may be met either with the constant supply 208, the variable supply 210, or both of the total energy supply 202.

Preferably, when the total energy demand does not exceed the constant supply 208 of the total energy supply 202, the e-cloud 226 meets the total energy demand by delivering energy to energy consumers 216 using a variable amount of the constant supply 208 of the total energy supply 204. Thus, in preferred embodiments, the e-cloud is in communication and has at least some control over the constant supply 208 of the total energy supply 202. This might occur, for example, when demand is low, such as overnight. On the other hand, when the total energy demand exceeds the constant supply 208, the e-cloud 226 preferably meets the total energy demand by delivering a constant amount of energy from the constant supply 208 and a variable amount of EEQ from the variable supply 210. More particularly, in preferred embodiments, the amount of energy taken from constant supply 208 and supplied is equal to the maximum amount of capped demand has been purchased from the energy distributor. This produces a load factor of 100% for this constant supply portion of the total energy supply. The remaining demand is then met using EEQ from the variable supply 210. Of course, it is contemplated, but not ideal, that variable amounts of energy or EEQ sourced from the constant supply 208 and variable supply 210, respectively, may also be used in satisfying an energy demand that is greater than or even lesser than or equal to the constant supply.

Next, as noted above, in certain cases, energy and EEQ from total energy supply 204 may be shared amongst multiple energy markets. In preferred embodiments, energy and EEQ are shared between markets only when the primary market's energy demands have been met. In FIG. 7, two different energy markets, namely Market A and Market B, are shown. Suppose Market A is comprised of a first group of energy consumers (e.g., end users or customers) that, collectively, demand a first total energy demand. Then, Market B is comprised of a second group of energy consumers that, collectively, demand a second total energy demand. In preferred embodiments, the e-cloud 228 is in communication with and is configured to provide energy and EEQ in response to energy demands received from either Market A or Market B. More preferably, where Market A is the primary market served by e-cloud 228, then the e-cloud provides energy or EEQ in response to energy demands from Market B (i.e., the secondary market) only when the total energy supply exceeds the total energy demand of Market A. Of course, there are other scenarios where the e-cloud 228 may be configured to share energy and EEQ with other markets other than the primary market, including in emergency situations.

As shown above, an advantage of this system 200 is that the demand and consumption charges for energy usage can be more easily controlled and made more predictable. Additionally, purchased energy is used more efficiently. In the examples shown above, demand charges may be limited to a fixed amount. For example, in certain cases, the demand change is based on the constant supply 208 (i.e., the capped demand), which is preferably pre-selected by the entity paying the demand charge. The consumption charge would be based on the amount of energy that is actually consumed. If the load factor over the relevant (i.e., billing) time period was 100%, such that all of the purchased energy was consumed, then the total consumption charge include the cost for consuming the entire constant supply 208 plus any costs associated with the consumption of EEQ required to meet the total demand.

To account for the costs associated with EEQ, the e-cloud 226 also preferably issues and generates an accounting of an energy debits to the consumer account 226 associated with each of the energy consumers 216. The value of the energy debit issued and associated with an energy consumer 216 is based on the EEQ that is provided to the energy consumer 206 from the e-cloud 228 in response to an energy demand. In certain embodiments, the supplier account 218 and the consumer account 226 comprise a single account or are linked together (e.g., an "end user account") and belong to a user that both contributes EEQ to the e-cloud 228 and also demands energy from the e-cloud and receives EEQ from the e-cloud. In that case, the energy credits and energy debits can be netted against one another to determine if there is a net debit or a net credit. Depending on whether there is a net debit or a net credit, a payment may be required or issued in favor of the account holder.

Next, it is also contemplated that one type of EEQ may provide a higher or lower amount of credit or incur a larger or smaller debit compared to other, different types of EEQ. These differences might account for the difficulties or costs of obtaining or of providing that type of EEQ to the e-cloud 228. For example, providing energy to e-cloud 228 from a solar panel-based DER 212 might require more infrastructure and upfront costs than merely adjusting the temperature setting on an air conditioning unit (i.e., a DSM measure). For that reason, providing an EEQ from the solar panel system might provide a larger credit or utilizing EEQ from that same system might incur a larger debit as compared to an equivalent EEQ resulting from a DSM measure or other EEQ supplier in order to account for these higher infrastructure costs. On the other hand, implementing DSM measures, such as modifying the temperature of a home, might require a greater incentive than simply offloading excess energy generated by a home's solar panel to the e-cloud 228. This represents a situation where contributing energy from a DER might provide a smaller credit and incur a smaller debit than an equivalent amount energy from DSM measures. It is contemplated that the credits and debits associated with each of the EEQ types might change over time. For example, EEQ from solar panel systems might be more scarce in the winter and plentiful in the summer. To account for the economics of this scarcity, the value of a unit of EEQ from solar panel systems might change depending on the time of year. Other similar factors might also impact other types of EEQ.

In preferred embodiments, the system 200 is configured to meet an energy demand using one or more different types of EEQ (e.g., solar and DSM). In some cases, the combination or makeup of EEQ sources used to meet energy demand may change over time or depending on the amount of energy demanded. Additionally, the system 200 is preferably configured to selectively choose EEQ from among the various EEQ that have been contributed. For example, EEQ from one EEQ supplier 202 might be selected while EEQ from a different EEQ supplier might not be selected. This selection process might be automatically carried out by the system 200 in order to minimize the costs or to maximize the benefits associated with providing energy to an energy consumer 206 and/or receiving EEQ from an EEQ supplier 202.

EXAMPLE

Figure 3:
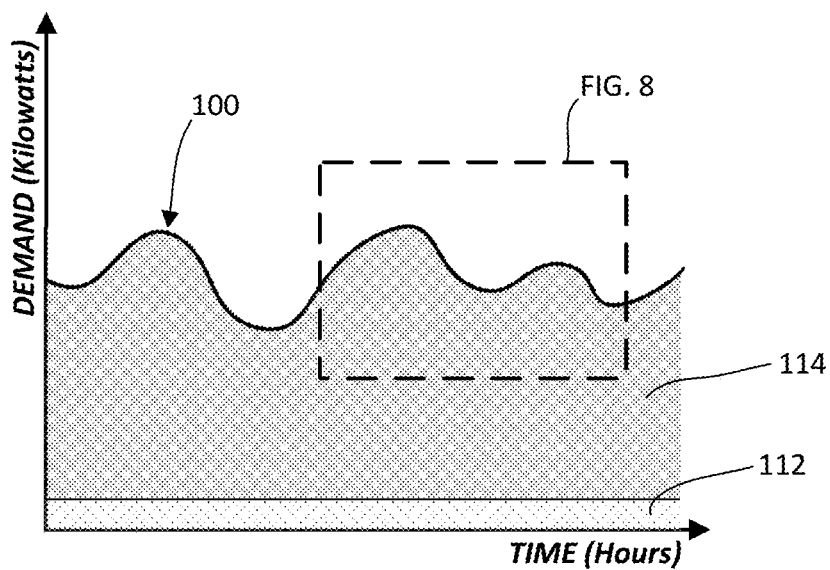
FIG. 3 depicts the conventional electrical energy demand curve of FIG. 1 and showing two different consumption regions.

From the discussion above, it is known that energy demands generally vary over time. Thus, the energy demands from energy consumers, collectively, form a total energy demand that varies over time. Meeting this time-varying demand requires a time-varying supply of energy, which is unpredictable. Meeting demand would be made at least at least somewhat more predictable if the total energy demand were broken into a time-constant portion that does not change and a time-varying portion. The demand curve 100 shown in the graph of FIG. 3 is representative of a typical time-varying demand. An enlarged portion of the demand curve 100 in FIG. 3 is shown in FIG. 8. By selectively dividing the area under this demand curve 100, such as at CUTOFF 4, this portion of the energy demand may be broken up into a time-constant portion 100A and a time-varying portion 100B. By purchasing only enough energy to meet the time-constant portion 100A, the demand charge associated with the purchase of energy may be controlled and the peaks in the time-varying portion 100B may be avoided. Preferably, the remaining time-varying portion 100B of the total demand is met by EEQ.

Referring again to FIG. 7 and with further reference to FIG. 9, one way for meeting the time-constant portion 100A and the time-varying portion 100B of the demand 100 using the presently-disclosed system 200 (FIG. 7) is shown. In each of the illustrated case, the time-constant portion 100A is preferably met by a constant supply portion 208 of the total energy supply 204. Again, this constant supply portion 208 is energy purchased from an energy distributor. By purchasing only a limited amount of energy (i.e., up to CUTOFF 4), the costs for purchasing this energy can be controlled. However, as previously discussed, this leaves a time-varying gap of energy demand between the total energy that is demanded and the total energy that is available from the constant energy portion. This the time-varying portion 100B of the total demand is preferably met using the time-varying portion 202 of the total energy supply 204. As described above, different combinations of EEQ that is provided by sources other than an energy distributor may be used to meet this remaining demand. Additionally, the combination of EEQ used in satisfying the time-varying demand portion may change over time. In this particular case, once demand exceeds CUTOFF 4, additional energy needs might be met by a first EEQ source 230, which may be the most abundant, least costly, easiest to access, etc. form of EEQ available (e.g., DSM). Similarly, once the total demand exceeds CUTOFF 5, additional energy needs might be met by a second EEQ source 232, such as DER. Lastly, if total demand exceeds CUTOFF 6, additional energy needs might be met by yet another EEQ source 234, such as batteries.

Alternative System

Figure 10:
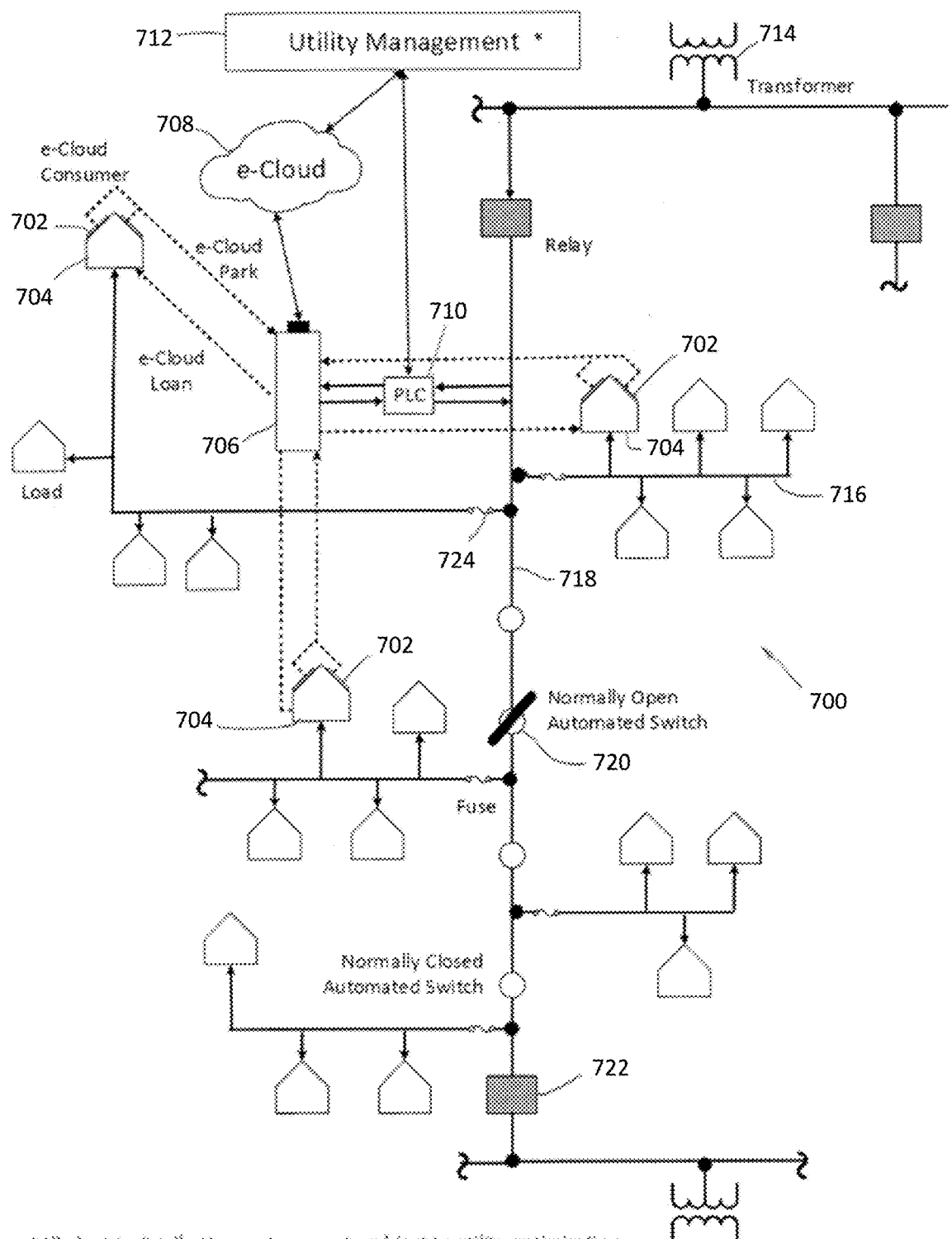
FIG. 10 is a schematic view of a system for storing and distributing an amount of utility energy in accordance an alternative embodiment of the present invention.

Referring now to FIG. 10, a schematic view of an alternative embodiment of a system for storing and distributing an amount of utility energy in accordance with the present invention is illustrated. As shown in FIG. 10, the system is designated generally by reference numeral 700. Preferred energy distribution system 700 comprises an energy generation source such as solar panels 702, each of which is adapted to generate a supply level of the amount of utility energy and transmit said supply level of the amount of utility energy to the energy generation system. Preferably, the energy generation source is an intermittent energy generation source. Preferred system also comprises an energy consumer such as residential homes 704, each of which has a demand level of the amount of utility energy. Preferred energy distribution system 700 further comprises an energy storage unit such as battery 706. Preferred battery 706 is adapted to receive and store a first portion of the amount of utility energy from the energy generation source and distribute a second portion of the amount of utility energy to the energy consumer. In addition, preferred energy distribution system 700 comprises a plurality of distributed resources or servers such as e-cloud 708. Preferred e-cloud 708 is adapted to receive a third portion of the amount of utility energy from the energy generation source and distribute a fourth portion of the amount of utility energy to the energy consumer. Preferred energy distribution system 700 still further comprises a processor such as programmable logic controller (PLC) 710. Preferred PLC 710 is adapted to control the distribution of the amount of utility energy to and from the energy storage unit and the e-cloud. Preferred energy distribution system 700 also comprises a utility 712. Preferred utility 712 is adapted to communicate with the energy distribution system for storing and distributing an amount of energy and control the energy storage unit. Energy distribution system 700 comprises transformer/inverter 714, a cable such as underground cable 100 or above ground cable 102, relay 110, switch 120, and fuse 130.

The processor causes a portion of the amount of utility energy to be stored in the energy distribution system when the supply level of the amount of utility energy exceeds the demand level of the energy consumer. More particularly, the processor causes a first portion of the amount of utility energy to be stored in the energy storage unit and a third portion of the amount of utility energy to be received in the e-cloud when the supply level of the amount of utility energy exceeds the demand level of the energy consumer. Also, the processor causes a portion of the amount of utility energy to be distributed to the energy consumer when the demand level of the energy consumer exceeds the supply level of the energy generation source. More particularly, the processor causes a second portion of the amount of utility energy from the energy storage unit and a fourth portion of the amount of utility energy to be distributed to the energy consumer when the demand level of the energy consumer exceeds the supply level of the energy generation source. It is also contemplated within the scope of the invention that energy distribution system 700 is adapted to distribute a portion of the utility energy to an energy consumer other than the energy consumer who generates a supply level of the amount of utility energy.

In energy distribution system 700, the use of utility assets is reduced because the energy storage unit and the e-cloud distribute energy when the energy distribution system has peak-loaded conditions and store energy when the system has minimal-load conditions. Still further, in energy distribution system 700, the utility is able to use an energy consumer's excess or surplus energy during periods when it is most valuable to the utility. More particularly, energy distribution system 700 is adapted to purchase energy from a wholesale distribution utility when energy costs are reduced, e.g., at nighttime. While FIG. 10 illustrates one configuration and arrangement of the system for the storage and distribution of utility energy, it is contemplated within the scope of the invention that the system may be of any suitable configuration and arrangement.

Figure 11:
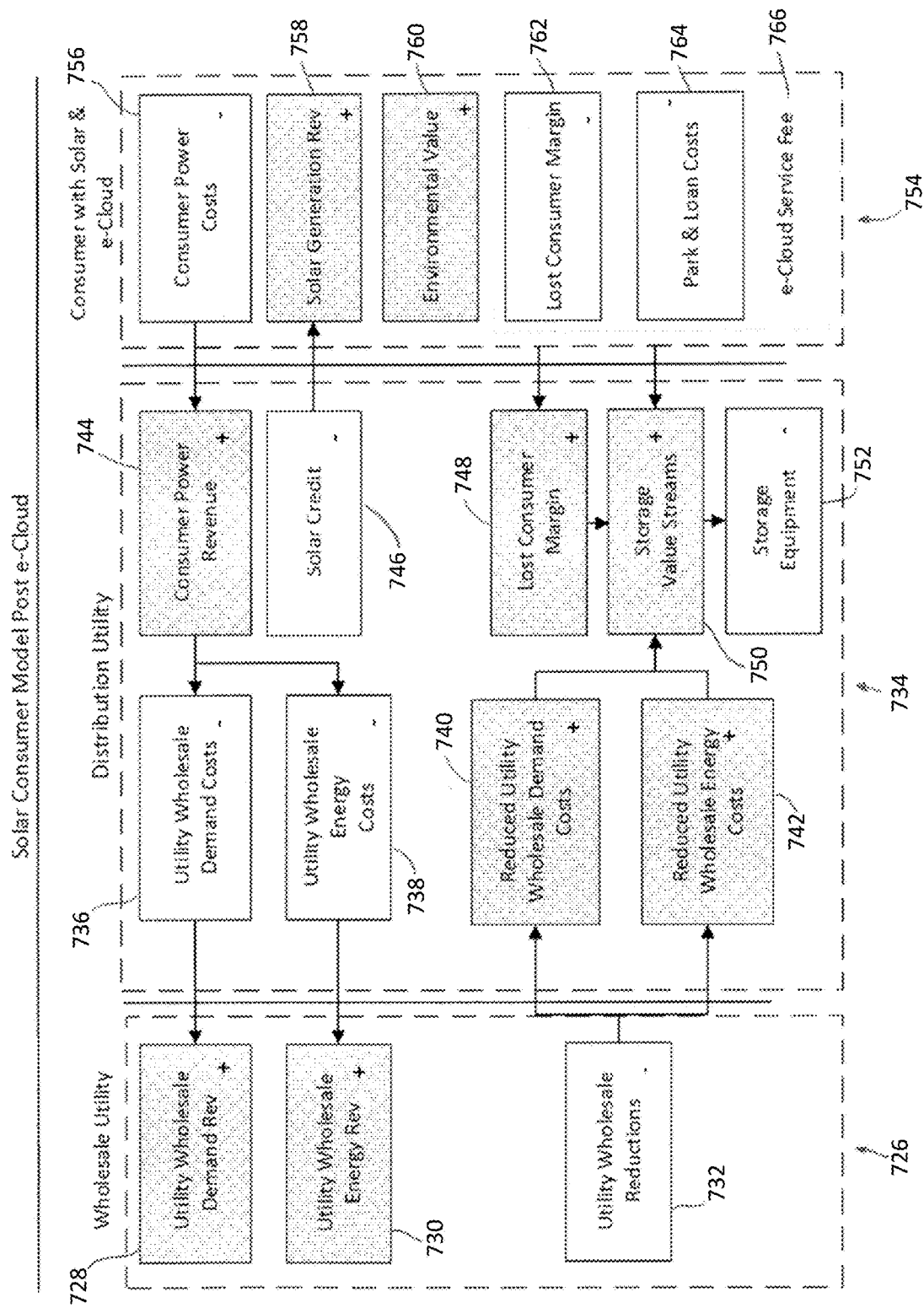
FIG. 11 is a schematic view of components for a utility and a consumer provided by the system of FIG. 10 for storing and distributing an amount of utility energy.

Referring now to FIG. 11, a schematic view of components for a wholesale utility, a distribution utility, and a consumer provided by system 700 is illustrated. As shown in FIG. 11, value components for a wholesale utility are designated generally by reference numeral 726 and comprise demand revenue 728, energy revenue 730, and reductions 732. In the system 700, the wholesale utility continues to receive demand revenue and energy revenue, but wholesale reductions occur due to reductions in distribution utility consumption of wholesale utility energy Value components for a distribution utility are designated generally by reference numeral 734 and comprise utility wholesale demand costs 736, utility wholesale energy costs 738, reduced utility wholesale demand costs 740, reduced utility wholesale energy costs 742, consumer power revenue 744, solar credit 746, lost consumer margin 748, storage value 750, and storage equipment 752. As shown in FIG. 11, the distribution utility reduces wholesale demand costs by reduction of the amount of wholesale utility energy purchased during peak periods of use and reduces the amount of energy costs by purchasing more energy during low-use hours when energy prices are lower. This value of injection and withdrawal from the energy storage unit and the e-cloud contributes to offset the cost of the investment in the storage unit and other distribution utility assets. Further, the distribution utility delivers all energy consumed by its energy consumers prior to energy generation. Still further, the distribution utility purchases energy generated by its energy consumers at a higher rate than the wholesale utility rate and allows its energy consumers to retain the value of their renewable energy credit or certificate (REC). The value from the service fees for the virtual storage, e-cloud, and solar purchase program also contributes to offset the cost of the storage units and lost margin from energy consumers choosing to install solar. In addition, the preferred energy distribution system provides improved circuit reliability and reduces the amount of distribution losses by reducing the amount of energy purchased from the wholesale utility and distributing energy from a location closer to the energy consumer.

Value components for a consumer are designated generally by reference numeral 754 and comprise consumer power costs 756, solar generation revenue 758, environmental value 760, lost consumer margin 762, park and loan costs 764, and e-cloud service fee 766. More particularly, an energy consumer with solar and e-cloud compensates the distribution utility for all energy consumed and for the park and loan service (injecting and withdrawing energy from the energy distribution system), is compensated for all energy generated from its solar installation, and retains the value of the REC.

Figure 12:
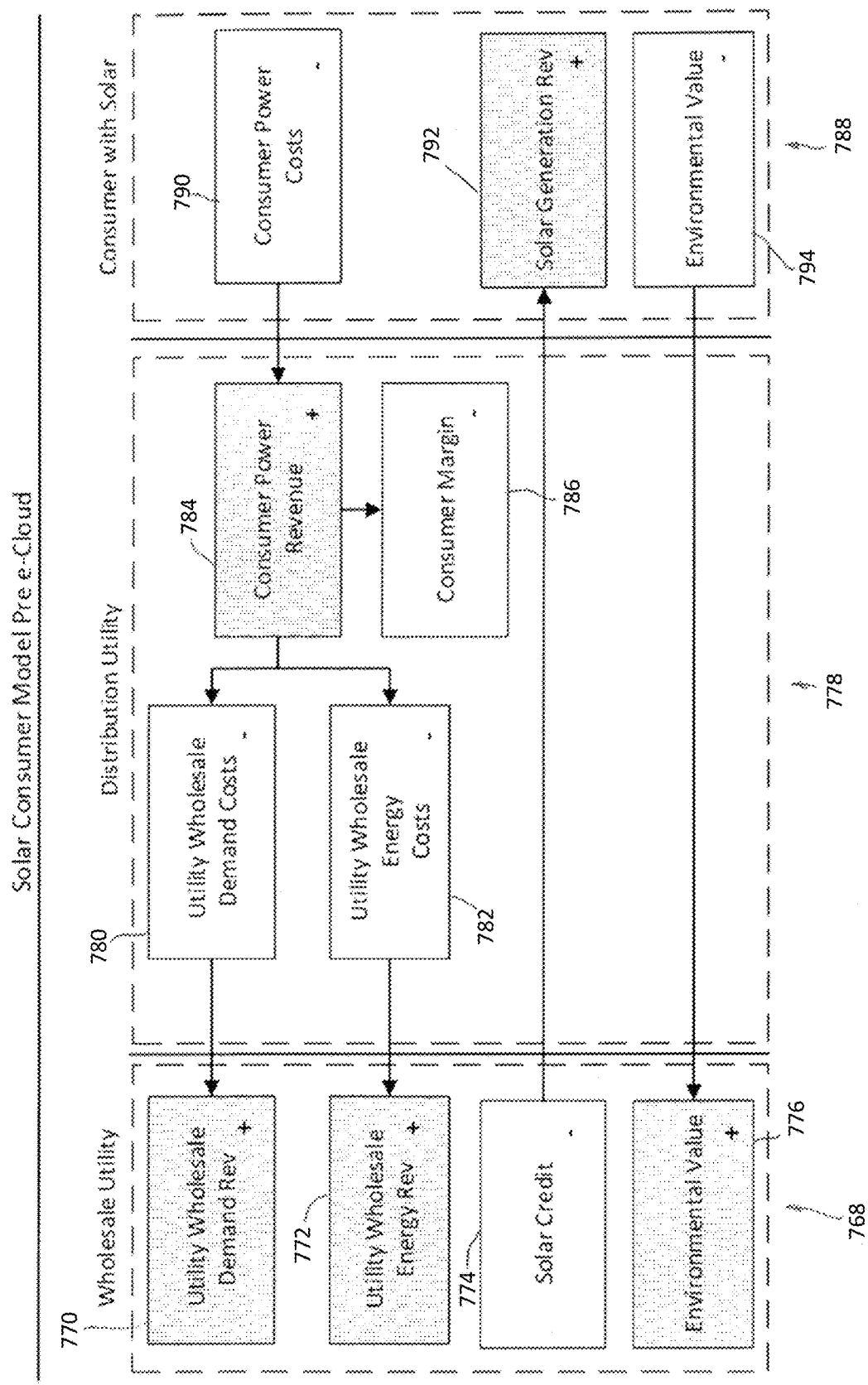
FIG. 12 is a schematic view of value components for a conventional system for distributing utility energy.

Referring now to FIG. 12, a schematic view of the value components for a conventional system for distributing utility energy is illustrated. As shown in FIG. 12, the value components for a wholesale utility are designated generally by reference numeral 768 and comprise demand revenue 770, energy revenue 772, solar credit 774, and environmental value 776. The value components for a distribution utility are designated generally by reference numeral 778 and comprise utility wholesale 780, utility wholesale energy costs 782, consumer power revenue 784, and consumer margin 786. The value components for a consumer are designated generally by reference numeral 788 and comprise consumer power costs 790, solar generation revenue 792, and environmental value 794. More particularly, a wholesale utility compensates an energy consumer directly with a lower value for solar-generated energy, and the wholesale utility retains the value of the REC. In addition, the distribution utility loses revenue related to an energy consumer's generation of solar energy which reduces the net energy consumption. More particularly, in the conventional system, the wholesale utility purchases energy generated by energy consumer's energy generating source and retains the right to the environmental benefit coming from the energy generating source. At the same time, the energy consumer with a solar installation consumes less energy from the distribution utility because the energy consumer is generating its own energy from its energy-generating source.

Figure 13:
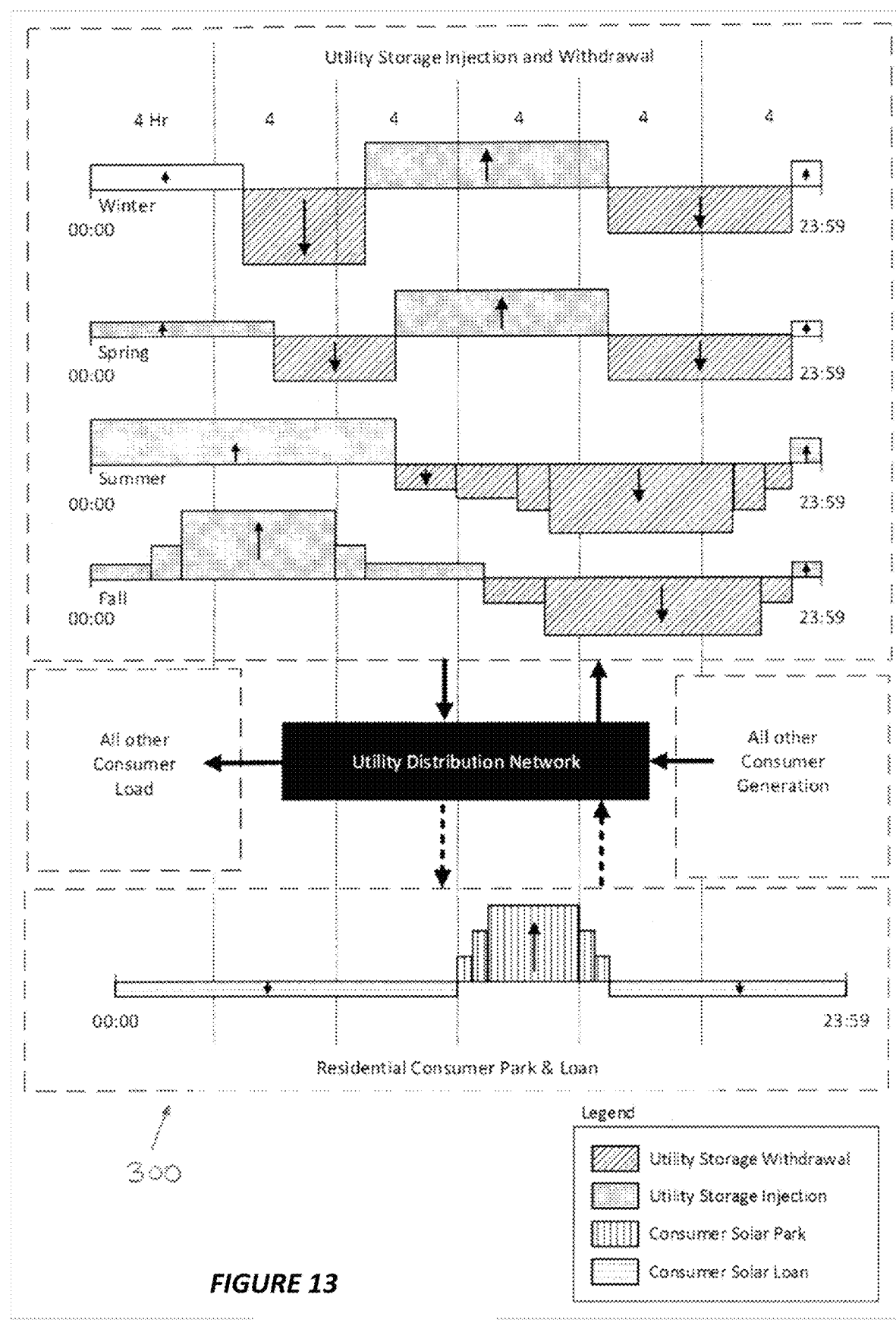
FIG. 13 is a schematic view of a utility storage asset operational system of the system of FIGS. 10 and 11.

Referring now to FIG. 13, a schematic view of a utility storage asset operational system of system for storing and distributing an amount of utility energy is illustrated. As shown in FIG. 13, the utility storage asset operational system is designated generally by reference numeral 300. Utility storage asset operational system 300 comprises utility storage injection and withdrawal, consumer park and loan, utility distribution network, other consumer generation, and other consumer load. More particularly, distribution utility injection preferably occurs during off-peak usage hours in the winter, spring, summer, and fall. Distribution utility withdrawal preferably occurs during peak-usage hours in the winter, spring, summer, and fall. Preferably, residential energy consumers inject surplus energy into the energy distribution system when their energy generation is greater than their energy demands and withdraw energy from the system when their energy demands exceed their energy generation. While FIG. 13 illustrates one configuration and arrangement of the utility storage asset operational system, it is contemplated within the scope of the invention that the utility asset operational system may be of any suitable configuration and arrangement.

Figure 14:
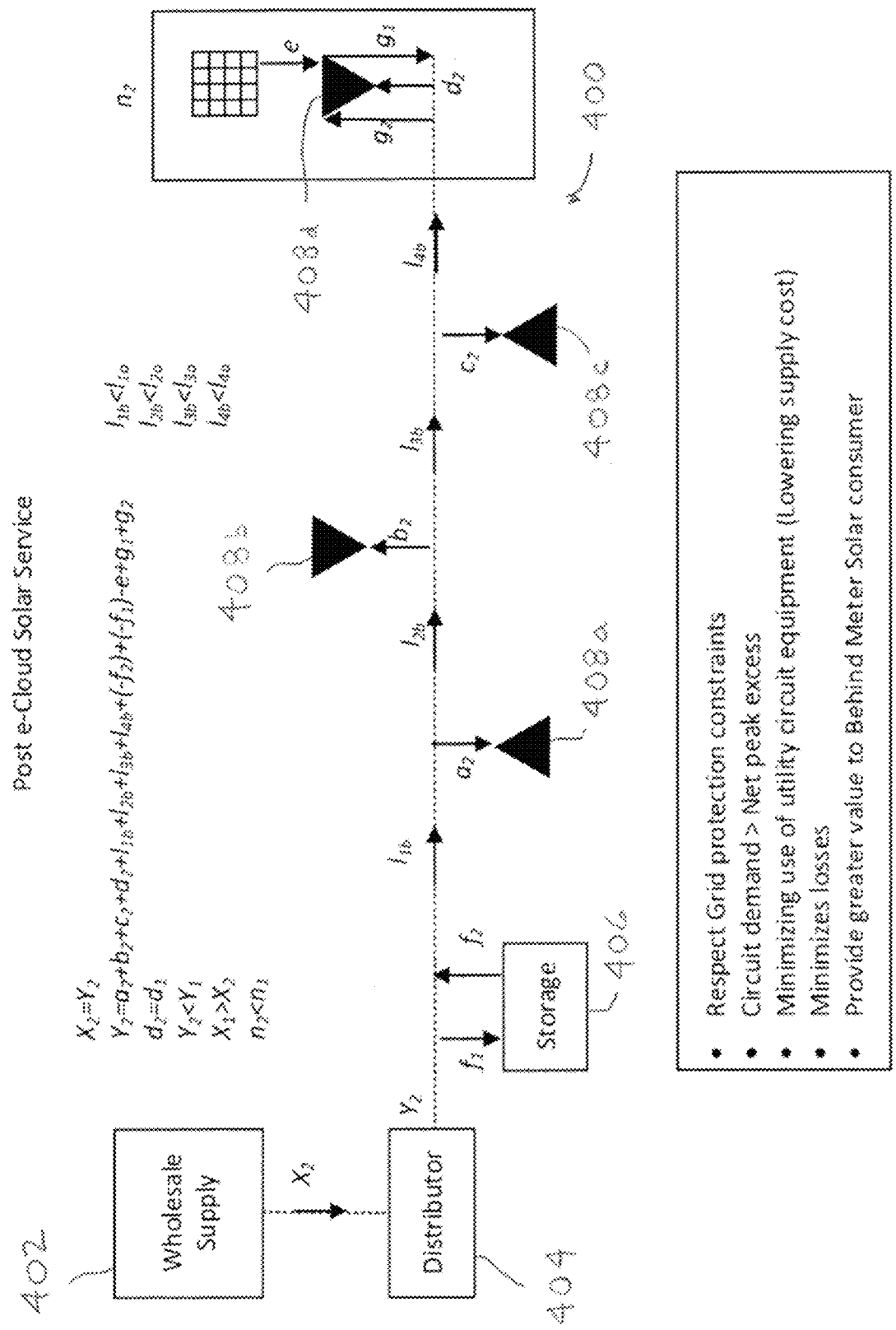
FIG. 14 is a schematic view of an exemplary circuit of the system of FIG. 10.

Referring now to FIG. 14, a schematic view of an exemplary circuit of a system for storing and distributing an amount of utility energy is illustrated. As shown in FIG. 14, the exemplary circuit is designated generally by reference numeral 400. Exemplary circuit 400 comprises wholesale utility 402, distribution utility 404, storage unit 406, and energy consumers 408a, 408b, 408c, and 408d. Exemplary circuit 400 is programmed to operate in accordance with the illustrated algorithms in which:

$X_2$ is the total power revenues for wholesale supplier post Consumer participation in E-cloud $Y_2$ is the total power revenues and losses for distribution supplier post Consumer participation in E-cloud $a_2$ is consumer a's electric costs (no solar) post Consumer participation in E-cloud $b_2$ is consumer b's electric costs (no solar) post Consumer participation in E-cloud $c_2$ is consumer c's electric costs (no solar) post Consumer participation in E-cloud $d_2$ is consumer d's electric costs (with solar) post Consumer participation in E-cloud $l_{1b}$ are electric losses for circuit segment 1 post Consumer participation in E-cloud $l_{2b}$ are electric losses for circuit segment 2 post Consumer participation in E-cloud $l_{3b}$ are electric losses for circuit segment 3 post Consumer participation in E-cloud $l_{4b}$ are electric losses for circuit segment 4 post Consumer participation in E-cloud e is the output from consumer solar generation installation $f_1$ is value from storage injections $f_2$ is the value from storage withdrawals $g_1$ is excess solar generation going to E-cloud $g_2$ is E-cloud withdrawals and delivery to consumer $n_2$ is solar consumer value post consumer participation in E-cloud More particularly, wholesale utility 402 delivers $X_2$ to distribution utility 404. Distribution utility 404 delivers $Y_2$. Preferably, $X_2$ equals $Y_2$. Distribution utility consumers without solar installations $a_2$, $b_2$, and $c_2$, plus distribution utility consumer with a solar installation $d_2$, plus distribution utility losses $l_{1b}$, $l_{2b}$, $l_{3b}$, and $l_{4b}$, plus storage injection $f_1$ or minus storage withdrawal $f_2$, minus e, plus $g_1$ and $g_2$ equals $Y_2$. In addition, $Y_2$ is less than $Y_1$ (see FIG. 15), $X_2$ is less than $X_1$ (see FIG. 15), $n_2$ is less than $n_1$ (see FIG. 15), $l_{1b}$ is less than $l_{1a}$ (see FIG. 15), $l_{2b}$ is less than $l_{2a}$ (see FIG. 15), $l_{3b}$ is less than $l_{3a}$ (see FIG. 15), and $l_{4b}$ is less than $l_{4a}$ (see FIG. 15). As shown in FIG. 14, $n_2$ represents an energy consumer having an energy generating source adapted to receive energy from and transmit energy to an energy storage unit such as a battery or an e-cloud. An $n_2$ energy consumer receives energy from distribution utility in the amount of $d_2$, delivers excess energy $g_1$ to the energy distribution system when the energy consumer's energy consumption is less than its energy generation and receives withdrawal energy $g_2$ from the energy distribution system when the energy consumer's energy generation is less than its consumption. While FIG. 14 illustrates one configuration and arrangement of the exemplary circuit, it is contemplated within the scope of the invention that the exemplary circuit may be of any suitable configuration and arrangement.

Figure 15:
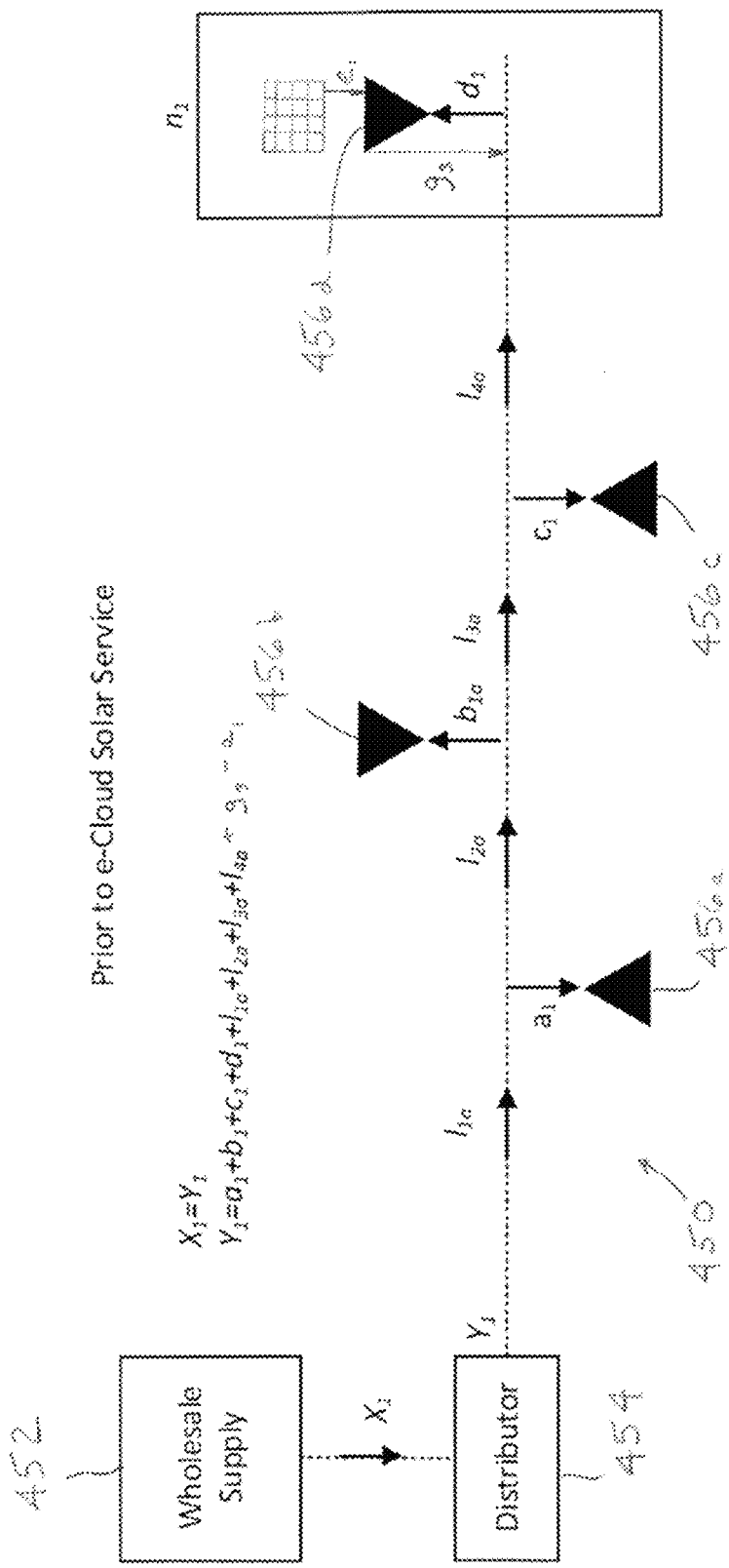
FIG. 15 is a schematic view of a conventional circuit.

Referring now to FIG. 15, a schematic view of a conventional circuit is illustrated. As shown in FIG. 15, the conventional circuit is designated generally by reference numeral 450. Conventional circuit 450 comprises wholesale utility 452, distribution utility 454, and energy consumers 456a, 456b, 456c, and 456d. Conventional circuit 450 is programmed to operate in accordance with the illustrated algorithms in which:

$X_1$ is the total power revenues for wholesale supplier prior to Consumer participation in E-cloud $Y_1$ is the total power revenues and losses for distribution supplier prior to Consumer participation in E-cloud $a_1$ is consumer a's electric costs (no solar) prior to Consumer participation in E-cloud $b_1$ is consumer b's electric costs (no solar) prior to Consumer participation in E-cloud $c_1$ is consumer c's electric costs (no solar) prior to Consumer participation in E-cloud $d_1$ is consumer d's electric costs (with solar) prior to Consumer participation in E-cloud $e_1$ is the output from consumer solar generation installation g$_3$ is excess solar generation transmitted to the wholesale utility l$_{1a}$ are electric losses for circuit segment 1 prior to Consumer participation in E-cloud l$_{2a}$ are electric losses for circuit segment 2 prior to Consumer participation in E-cloud l$_{3a}$ are electric losses for circuit segment 3 prior to Consumer participation in E-cloud l$_{4a}$ are electric losses for circuit segment 4 prior to Consumer participation in E-cloud n$_1$ is solar consumer value prior to consumer participation in E-cloud More particularly, a wholesale utility 452 delivers X$_1$ to distribution utility 454. Distribution utility delivers Y$_1$. Preferably, X$_1$ equals Y$_1$. Energy consumers without a solar installation a$_1$, b$_1$, and c$_1$, plus energy consumer with a solar installation d$_1$, plus energy distribution losses l$_{1a}$, l$_{2a}$, l$_{3a}$, and l$_{4a}$, minus e$_1$, plus g$_3$ equals Y$_1$. As shown in FIG. 15, n$_1$ represents a distribution utility consumer with an energy generating source but no access to an energy storage unit or an e-cloud. As also shown in FIG. 15, the conventional circuit does not include a storage unit or an e-cloud and n$_1$ receives energy distribution utility in the amount of d$_1$. As noted above, in the conventional energy distribution system, X$_1$ is greater than X$_2$, and Y$_1$ is greater than Y$_2$, i.e., the revenue paid by the distribution utility to the wholesale utility in the conventional energy distribution system is greater than the revenue paid in the preferred energy distribution system, the revenue paid by the distribution utility to its energy consumers in the conventional energy distribution system is greater than the revenue paid in the preferred energy distribution system, and the electric distribution losses experienced in the convention energy distribution system are greater than the electric distribution losses experienced in the preferred energy distribution system.

Figure 16:
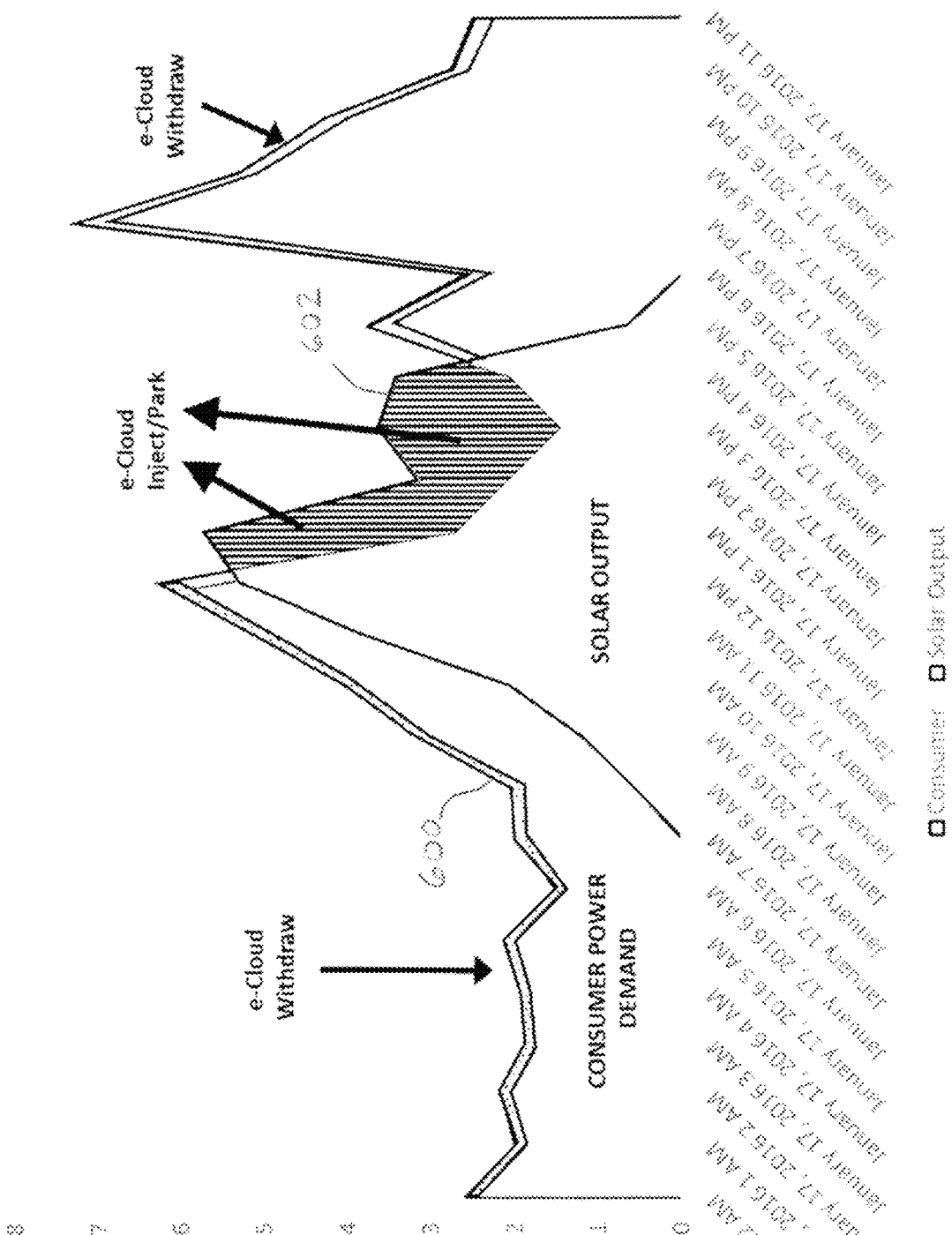
FIG. 16 is a graphical illustration of an exemplary consumer demand and solar output over a twenty-four (24) hour period of time.

Referring now to FIG. 16, a graphical depiction of an exemplary consumer demand and solar output over a twenty-four (24) hour period of time is illustrated. As shown in FIG. 16, consumer energy demand is illustrated by line 600 and solar output is illustrated by line 602. Solar output that exceeds consumer energy demand is received by and stored in one or more storage units (not shown). By contrast, when consumer energy demand exceeds solar output, output received by and stored in the one or more storage units and/or e-cloud is distributed form the one or more storage units and/or e-cloud to the consumer.

The invention also comprises a method for storing and distributing an amount of utility energy. The preferred method comprises providing a system for storing and distributing an amount of utility energy. The preferred system comprises an energy generation source that is adapted to generate a supply level of the amount of utility energy, an energy consumer that has a demand level of the amount of utility energy, an energy storage unit that is adapted to receive and store a first portion of the amount of utility energy from the energy generation source and distribute a second portion of the amount of utility energy to the energy consumer, a processor that is adapted to control the distribution of the amount of utility energy to and from the energy storage unit, an e-cloud that is adapted to communicate with the energy storage unit, and a utility that is adapted to communicate with the system for storing and distributing an amount of energy. In the preferred embodiments of the system, the processor causes the first portion of the amount of utility energy to be stored in the energy storage unit when the supply level of the amount of utility energy exceeds the demand level of the energy consumer and causes the second portion of the amount of utility energy to be distributed to the energy consumer when the demand level of the energy consumer exceeds the supply level of the energy generation source. The preferred method further comprises controlling the storage of the first portion of the amount of utility energy and the distribution of the second portion of the amount of utility energy.

In other preferred embodiments of the method, the method further comprises storing the first portion of the amount of utility energy to be stored in the energy storage unit when the supply level of the amount of utility energy exceeds the demand level of the energy consumer and distributing the second portion of the amount of utility energy to be distributed to the energy consumer when the demand level of the energy consumer exceeds the supply level of the energy generation source. In still other preferred embodiments of the method, the system is adapted to receive and store the first portion of the amount of utility energy from a plurality of energy generation sources and distribute the second portion of the amount of utility energy to a plurality of energy consumers. In other preferred embodiments of the method, the system allows the utility to store and distribute a consumer's excess or surplus energy during periods when it is most valuable to the utility.

In operation, several advantages of the preferred embodiments of the system and method for the storage and distribution of utility energy are achieved. For example, the preferred embodiments of the system and method effectively and efficiently store and distribute output from DER with high output variability such as solar panels. The preferred embodiments of the system and method provide sufficient resiliency, redundancy, and flexibility and sufficiently minimize the use of utility assets and losses. The preferred embodiments of the system and method effectively and efficiently address service disruptions and outages. The preferred embodiments of the system and method optimize the value of DER and solar panel installations. In addition, the preferred embodiments of the system and method minimize overhead costs and wear and tear on the system and its component parts. The preferred embodiments of the system and method minimize any adverse impacts on the environment. The preferred embodiments of the system and method allow a utility to use a consumer's excess or surplus energy during periods when it is most valuable to the utility.

More particularly, the availability of excess output from a consumer's solar panels and its value to the utility serving the consumer varies throughout the day. The greatest value is available when the excess output is available at the time of greatest demand for electricity by all of the utility's consumers. Conventional systems and methods include the installation of batteries at the consumer's location for storage of excess output from the consumer's solar panels. However, it is not economical if the stored output is only available to permit use by the consumer and not by the utility. In addition, conventional utilities set prices for the purchase of excess output from their consumer's solar installations at lower levels because the utilities cannot use the excess output during periods when it is most valuable to the utility. In another conventional approach, commonly referred to as net metering, higher effective prices are paid to consumers for excess solar output (equal to the retail price paid by the consumer for electricity), but then the utility on average pays too much because there still is no ability to use the excess output when it is most valuable to the utility.

By contrast, the preferred embodiments of the system and method of the invention recognize that electricity has different values at different times and provide a system to permit a utility to capture greater value from solar generation or other DER in excess of what is needed at the location of the DER. The preferred embodiments of the system and method accomplish this by providing a system that stores excess output from consumer solar power installations in storage facilities owned and controlled by the utility at remote locations on the electric distribution system. The utility-controlled storage permits the utility to use the excess output at times and in amounts that will maximize value to the utility and to other energy consumers, e.g. system reliability, reduced electricity losses, reduces use of utility assets, and the like. The consumer may use the excess energy output the consumer has put into storage whenever on-site generation does not provide all of the consumer's electricity needs.

In addition, the preferred embodiments of the system and method of the invention provide support for utility micro-grids through the increased capacity and use of energy storage devices that increase system reliability and resiliency through islanding. The preferred embodiment of the system and method of the invention also provide improved power quality and conditioning through the use of storage for immediate contribution of variable load, demand, and back-up power. Further, the preferred embodiments of the system and method of the invention provide reduced or deferred electric distribution system investments such as transformers, additional line capacity, breakers, capacitors, and the like.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

The invention claimed is:

1. A system for accounting for and allocating energy value amongst an energy equivalent quantity (EEQ) supplier that is associated with a supplier account and that is configured to contribute EEQ to a total energy supply and energy consumers that are each associated with a consumer account and that are each configured to issue energy demands for delivery of energy, the system comprising:
    an energy system comprising:
        an energy generator adapted to generate energy; and
        an energy storage adapted to receive and store a first portion of energy produced by the energy generator and adapted to distribute a second portion of energy produced by the energy generator;
    an energy cloud value allocation system (e-cloud) configured to:
        facilitate and control an exchange of EEQ and energy between the EEQ supplier and the energy consumers;
        receive EEQ contributions from the EEQ supplier and to generate an accounting of energy credits, wherein a value of each energy credit is based on the EEQ contribution provided to the e-cloud by the EEQ supplier;
        receive energy demands from the energy consumers;
        satisfy the energy demands by delivering energy and EEQ to the consumers and to generate an accounting of energy debits, where a value of each energy debit is based on the EEQ that is delivered to the energy consumers from the e-cloud in response to energy demands.

2. An energy delivery system using the system of claim 1, the energy delivery system further comprising:
    said EEQ supplier, wherein the EEQ supplier further includes:
        a constant energy supply configured to provide a constant supply of the total energy supply; and
        a micro-grid configured to satisfy the energy demands by providing a variable supply of the total energy supply, the micro-grid including two or more of an energy generator, an energy storage, and demand-side management.

3. The energy delivery system of claim 2 wherein:
    when a total energy demand of the energy consumers does not exceed the constant energy supply, the e-cloud is configured to satisfy the energy demands by providing energy to the energy consumers using only the constant supply of the total energy supply;
    when the total energy demand exceeds the constant energy supply, the e-cloud is configured to satisfy a first portion of the energy demands by providing energy to the energy consumers using the constant supply of the total energy supply and to satisfy a remaining portion of the energy demands by providing EEQ to the energy consumers using the variable supply from the e-cloud.

4. The energy delivery system of claim 3 wherein, when the total energy demand exceeds the constant energy supply, the e-cloud is configured to satisfy the first portion of the energy demands by providing energy to the energy consumers using a constant amount of energy of the constant supply of the total energy supply and to satisfy the remaining portion of the energy demands by providing EEQ to the energy consumers using a variable amount of EEQ of the variable supply from the e-cloud.

5. An energy delivery and accounting system comprising:
    a total energy supply comprising a constant supply and a variable supply;
    an energy system comprising:
        an energy generator; and
        an energy storage adapted to receive and store a first portion of energy produced by the energy generator and to distribute a second portion of energy produced by the energy generator;
    energy equivalent quantity (EEQ) suppliers that are each associated with a supplier account and that are each configured to contribute EEQ to the variable supply of the total energy supply;
    energy consumers that are each associated with a consumer account, that are each configured to issue energy demands for delivery of energy, and that, collectively, demand a total energy demand comprised of a constant demand and a variable demand; and
    an energy cloud value allocation system (e-cloud) for (i) facilitating and controlling an exchange of EEQ between the EEQ suppliers and the energy consumers and (ii) allocating energy value amongst the EEQ suppliers and the energy consumers,
    wherein the e-cloud is configured to:
        provide said supplier accounts and to associate a supplier account with each of the EEQ suppliers;
        provide said consumer accounts and to associate a consumer account with each of the energy consumers;
        receive EEQ contributions from each of the EEQ suppliers;

issue an energy credit to the supplier account associated with each of the EEQ suppliers, wherein a value of each energy credit issued is based on the EEQ contributed to the e-cloud by the EEQ supplier;

receive an energy demand from the energy consumers;

satisfy energy demands by delivering energy and EEQ from the e-cloud to the energy consumers wherein:

when the total energy demand does not exceed the constant supply, delivering a variable amount of energy to the energy consumers from the constant supply of the total energy supply, and when the total energy demand exceeds the constant supply, delivering a constant amount of energy to the energy consumers from the constant supply of the total energy supply and delivering a variable amount of EEQ of the variable supply; and issue an energy debit to the consumer account associated with each of the energy consumers, wherein a value of the energy debit issued is based on the EEQ delivered to the energy consumer from the e-cloud.

6. A method for accounting for and allocating energy value comprising the steps of:

providing an energy system comprising:

an energy generator; and an energy storage adapted to receive and store a first portion of energy produced by the energy generator and to distribute a second portion of energy produced by the energy generator;

providing energy equivalent quantity (EEQ) suppliers that are each associated with a supplier account and that are each configured to supply EEQ as a contribution to the variable supply of the total energy supply;

providing energy consumers that are each associated with a consumer account, that are each configured to issue an energy demand for delivery of energy, and that, collectively, demand a total energy demand comprised of a constant demand and a variable demand;

providing an energy cloud value allocation system (e-cloud) for (i) facilitating and controlling delivery of energy and EEQ to the energy consumers in response to energy demands and (ii) allocating energy value, including energy credits and energy debits, amongst the EEQ suppliers and the energy consumers, the e-cloud being configured to:

provide said supplier accounts and to associate a supplier account with each of the EEQ suppliers;

provide said consumer accounts and to associate a consumer account with each of the energy consumers;

receive EEQ contributions from EEQ suppliers;

issue an energy credit to a supplier account associated with the EEQ supplier that contributed EEQ to the e-cloud, wherein a value of the energy credit issued is based on the EEQ contributed;

receive energy demands from the energy consumers;

satisfy the energy demands by providing energy and EEQ to the energy consumers; and issue an energy debit to a consumer account associated with the energy consumer receiving EEQ from the e-cloud in response to an energy demand, wherein a value of the energy debit issued is based on the EEQ provided to the energy consumer from the e-cloud in response to the energy demand.

7. The method of claim 6 wherein, when the total energy demand does not exceed the constant energy supply, the e-cloud is configured to satisfy the energy demands by providing energy to the energy consumers using only the constant supply of the total energy supply; and when the total energy demand exceeds the constant energy supply, the e-cloud is configured to satisfy a first portion of the energy demands by providing energy to the energy consumers using the constant supply of the total energy supply and to satisfy a remaining portion of the energy demands by providing EEQ to the energy consumers using the variable supply from the e-cloud.

8. The method of claim 7 further comprising the step of, in providing EEQ to the energy consumers in response to energy demands, selectively choosing EEQ that was contributed to the e-cloud by a first EEQ supplier and not choosing EEQ that was contributed to the e-cloud by a second EEQ supplier.

9. The method of claim 8 wherein EEQ is selectively chosen in providing EEQ so as to minimize a cost associated with satisfying the energy demand.

10. The method of claim 9 wherein, in providing EEQ in response to the energy demands, EEQ is selectively chosen so as to minimize the cost to the energy consumers.

11. The method of claim 9 wherein, in providing EEQ in response to the energy demands, EEQ is selectively chosen so as to minimize the cost to the energy distributors.

12. The method of claim 6:

wherein the energy consumers comprise:

a first energy market comprised of energy consumers that, collectively, demand a first total energy demand;

a second and separate energy market comprised of energy consumers that, collectively, demand a second total energy demand;

wherein the e-cloud is configured to provide energy and EEQ in response to energy demands received from the first energy market and from the second energy market.

13. The method of claim 12 wherein EEQ is provided in response to energy demands from the second energy market only when the total energy supply exceeds the first total energy demand.

14. The method of claim 6 wherein the EEQ suppliers are selected from the group consisting of: an energy generator, an energy storage, and demand-side management (DSM).

15. The method of claim 14 wherein the EEQ provided from the e-cloud to the energy consumers in response to energy demands is comprised of EEQ sourced from a combination of at least two different EEQ suppliers.

16. The method of claim 15 wherein the combination of the at least two different EEQ suppliers varies over time as EEQ is provided to the energy consumers.

17. The method of claim 15 wherein the combination of the at least two different EEQ suppliers includes at least two of the group consisting of: an energy generator, an energy storage, and DSM.

18. The method of claim 6 wherein the energy consumers are selected from a group consisting of: a wholesale energy market, a retail energy market, and an end user.

19. The method of claim 6 wherein a first end user is both an EEQ supplier and an energy consumer and a first end user account associated with the first end user includes both a supplier account and a consumer account, the method further comprising the steps of:

at a first time period, receiving EEQ from the first end user and issuing a corresponding energy credit to the first end user account;

at a second and different time period, receiving an energy demand from the first end user;

in response to receipt of the energy demand from the first end user, providing EEQ from the e-cloud to the first end user and issuing a corresponding energy debit to the first end user account.

* * * * *